US011225198B2

(12) United States Patent
Boyle et al.

(10) Patent No.: US 11,225,198 B2
(45) Date of Patent: Jan. 18, 2022

(54) ROOF RACK

(71) Applicants: Norman Boyle, Merimbula (AU); Brad Stebbing, Sydney (AU)

(72) Inventors: Norman Boyle, Merimbula (AU); Brad Stebbing, Sydney (AU)

(*) Notice: Subject to any disclaimer, the term of this patent is extended or adjusted under 35 U.S.C. 154(b) by 0 days.

(21) Appl. No.: 16/487,639

(22) PCT Filed: Feb. 21, 2018

(86) PCT No.: PCT/AU2018/050141
§ 371 (c)(1),
(2) Date: Aug. 21, 2019

(87) PCT Pub. No.: WO2018/152574
PCT Pub. Date: Aug. 30, 2018

(65) Prior Publication Data
US 2020/0062188 A1 Feb. 27, 2020

(30) Foreign Application Priority Data

Feb. 21, 2017 (AU) .............................. 2017900559
Sep. 7, 2017 (AU) .............................. 2017101232

(51) Int. Cl.
*B60R 9/042* (2006.01)
*B60R 9/045* (2006.01)
*B60R 9/08* (2006.01)

(52) U.S. Cl.
CPC .............. *B60R 9/042* (2013.01); *B60R 9/045* (2013.01); *B60R 9/08* (2013.01)

(58) Field of Classification Search
CPC . B60R 9/042; B60R 9/08; B60R 9/045; B60P 3/1025
(Continued)

(56) References Cited

U.S. PATENT DOCUMENTS 3,460,694 A * 8/1969 Simms ................. B60P 3/1025
                                                   414/462
4,003,485 A * 1/1977 Edgerton ............. B60P 3/1025
                                                   414/462
(Continued)

FOREIGN PATENT DOCUMENTS

WO         2000001557 A1    1/2000
WO         2010064233 A1    6/2010
WO    WO-2010064233 A1 *    6/2010  ............. B60R 9/042

OTHER PUBLICATIONS

International Search Report for Application No. PCT/AU2018/050141 dated Apr. 26, 2018, 5 pages.

*Primary Examiner* — Adam J Waggenspack
(74) *Attorney, Agent, or Firm* — Howard & Howard Attorneys PLLC

(57) ABSTRACT

Disclosed herein is a roof rack comprising a plurality of roof attachments for attaching the roof rack to a roof of an automobile; at least two cross bars that are arrangeable across the roof of the automobile, each cross bar comprising a plurality of members configured to move relative to each other such that the cross bar is extendable into an extended configuration in which a portion of the cross bar would overhang a side of the automobile; a mounting rack configured to receive articles on an upper portion thereof, the mounting rack being mounted to the at least two cross bars in a spaced relationship thereto, whereby extending the at least two cross bars into their extended configurations moves the mounting rack between a first position where it would overlie the roof of the automobile and a second position where it would overhanging the side of the automobile, wherein the mounting rack is mounted to a member of the at least two cross bars which is the last to move into a position overhanging the side of the automobile; a pivot that is not operable until the mounting rack is in the second (Continued)

position, the mounting rack being pivotable between the second position and a third position where the mounting rack would be adjacent the side of the automobile with the upper portion facing away from the side of the automobile for loading or unloading of the articles; and a ground engaging portion configured to engage the ground when the mounting rack is in the third position.

15 Claims, 11 Drawing Sheets

(58) Field of Classification Search
USPC .......................................................... 224/310
See application file for complete search history.

(56) References Cited

U.S. PATENT DOCUMENTS

| | | | |
|---|---|---|---|
| 5,884,824 A | | 3/1999 | Spring, Jr. |
| 6,015,074 A | * | 1/2000 | Snavely .................. B60R 9/042 |
| | | | 224/310 |
| 6,158,638 A | | 12/2000 | Szigeti |
| 6,802,537 B1 | * | 10/2004 | Tolfsen .................. B60N 2/508 |
| | | | 280/727 |
| 7,815,083 B2 | * | 10/2010 | Clausen .................... B60R 9/06 |
| | | | 224/501 |
| 9,174,585 B2 | * | 11/2015 | Noonan .................. B60R 9/048 |
| 10,059,273 B1 | * | 8/2018 | Mercurio ................ B60R 9/045 |
| 2009/0140021 A1 | * | 6/2009 | Richter .................... E06C 5/04 |
| | | | 224/310 |

* cited by examiner

ROOF RACK

PRIORITY

The subject application is the National Stage of International Patent Application No. PCT/AU2018/050141, filed on Feb. 21, 2018, the contents of which are incorporated herein by reference in their entirety.

TECHNICAL FIELD

The present invention relates to roof racks for automobiles.

BACKGROUND ART

Roof racks are often used to carry bulky articles that either cannot physically fit inside of an automobile or which are otherwise not wanted inside the automobile (e.g. because they are wet and/or dirty or due to other space constraints). Articles such as bicycles, canoes and kayaks are, for example, commonly carried on automobile roof racks.

Loading articles onto the mounting portions of roof racks can, however, be difficult, and especially when the articles are heavy and/or bulky. Firstly, the article must be lifted to a height above the automobile's roof, then positioned over the roof and, finally, lowered onto the roof rack. Such an operation may require two (or more) people to perform and carries a risk of injury, especially if the article is relatively heavy.

Once located on the roof rack, the article then needs to be securely attached, which can again be difficult due to the height and relatively inaccessible nature of the automobile's roof. Visually confirming that bulky articles such as kayaks are indeed securely attached to the roof rack can also be problematic because the articles can obscure a person's line of sight when standing next to the automobile.

Specialised roof racks that are configurable to present their mounting portions in a more accessible location for loading and unloading are known. However, such roof racks do not appear to have been successfully commercialised, possibly because of their relatively complicated assemblies, difficulty of operation or the high degree of mechanical stress their operation would cause on other components of the roof rack.

SUMMARY OF INVENTION

In a first aspect, the present invention provides a roof rack. The roof rack comprises a plurality of roof attachments for attaching the roof rack to a roof of an automobile; at least two cross bars that are arrangeable across the roof of the automobile, each cross bar comprising a plurality of members configured to move relative to each other such that the cross bar is extendable into an extended configuration in which a portion of the cross bar would overhang a side of the automobile; a mounting rack configured to receive articles on an upper portion thereof, the mounting rack being mounted to the at least two cross bars in a spaced relationship thereto, whereby extending the at least two cross bars into their extended configurations moves the mounting rack between a first position where it would overlie the roof of the automobile and a second position where it would overhanging the side of the automobile, wherein the mounting rack is mounted to a member of the at least two cross bars which is the last to move into a position overhanging the side of the automobile; a pivot that is not operable until the mounting rack is in the second position, the mounting rack being pivotable between the second position and a third position where the mounting rack would be adjacent the side of the automobile with the upper portion facing away from the side of the automobile for loading or unloading of the articles; and a ground engaging portion configured to engage the ground when the mounting rack is in the third position.

The roof rack of the present intention can advantageously be operated to position its mounting rack in a more easily accessible location than on top of the roof of an automobile. Positioning the mounting rack adjacent the side of an automobile, with its upper portion facing away from the side of the automobile would enable articles (e.g. bicycles, kayaks, canoes, boats, skis, snowboards, jerry cans, gas cylinders and luggage) to be loaded onto or unloaded from the roof rack more easily and safely than would be the case for conventional roof racks.

In particular, the articles do not have to be lifted to a height that is higher than the automobile's roof in order to be loaded onto the roof rack. Indeed, the upper portion of the mounting rack is essentially presented in a location and orientation where articles can be loaded at a height that is below a user's shoulder level. Further, the articles can be loaded onto the roof rack at the side of the automobile, meaning that the user does not have to lean over the roof of a car whilst holding a potentially heavy article above their head. As would be appreciated, such a position places the user's back and shoulders under considerable strain and risk of injury.

Furthermore, due to the location and orientation of the upper portion of the mounting rack adjacent the side of the automobile, a user is more readily able to access and see all around articles that have been loaded onto the roof rack than would be the case if positioned above the automobile's roof. This not only makes it simpler for the user to arrange the tie downs etc. that are required to securely affix the article to the roof rack, but also ensure that the positions of these tie downs etc. are correct. In contrast, positioning such tie downs etc. when the article is on a roof rack on top of an automobile can be quite challenging. Not only does the user typically have to stand on the side of the automobile in precarious positions (e.g. part inside an open door or on a tow ball, etc.) whilst tying down the article on the roof rack, they often cannot clearly see where and to what the tie down is being wrapped around, and work instead on feel. As would be appreciated, the consequence of an article falling off a roof rack whilst in transit could be catastrophic.

Furthermore, providing a ground engaging portion for supporting the roof rack and, more specifically, the mounting portion (and any articles mounted thereon which, as would be appreciated, could be relatively heavy) when it its third position, can also provide a number of benefits. Perhaps most importantly, the ground engaging portion will take at least some of the weight of the mounting rack and any articles thereon when in this offset position (i.e. with respect to the roof of the automobile and the roof attachments), thereby reducing the degree of mechanical stress on other components of the roof rack. The roof rack of the present invention may therefore have a simpler construction than existing roof racks, with all the attendant benefits of such (e.g. less materials, lighter weight, less wind resistance, etc.). Furthermore, in some embodiments (as will be described in further detail below), such a ground engaging portion may provide a mechanical advantage in operation (i.e. making the pivoting movement physically easier, even when heavy articles are mounted to the mounting rack), may stabilise the mounting rack for loading and unloading, and may act as a safeguard against the roof rack accidentally pivoting so far that it makes physical contact with the side of the automobile.

In some embodiments, the at least two cross bars may be arrangeable transversely across the roof of the automobile. In some embodiments, the at least two cross bars may be arrangeable transversely across the roof of the automobile between opposing roof attachments.

In some embodiments, the pivot may be provided in a member of each cross bar that would overhang the side of the automobile when in the extended configuration. In some of such embodiments, the pivot may be provided in the same member of each cross bar that the mounting rack is mounted to.

In some embodiments, the plurality of members of the at least two cross bars may be slidable relative to each other. In some embodiments, at least some of the plurality of members of the cross bars may be telescopically extendable. In some embodiments, the plurality of members of the at least two cross bars may be telescopically extendable members configured to slide relative to each other.

In some embodiments, the mounting rack may be configured to move substantially horizontally between the first position and the second position. As would be appreciated, the mechanical actuators required to perform such a movement would be relatively simple and hence would be generally cheaper, more durable and reliable.

In some embodiments, the pivot may comprise a release mechanism which must be released before the mounting rack can pivot between the second and third positions. Such a release mechanism may provide an advantageous safety feature, where a positive action by an operator is required before downward pivoting of the mounting rack can occur (e.g. so that the operator has the opportunity to brace themselves for the weight they will experience during pivoting).

In some embodiments, the roof rack may comprise a handle that is operable to move the mounting rack between the first, second and third positions. Such a handle may be positioned at a distal end of the roof rack from the pivot in order to minimise the weight of the mounting rack (and any articles thereon) felt by the operator (i.e. due to the longest possible "lever" being used). In some embodiments (to be described in further detail below), the handle may define the ground engaging portion when the mounting rack is in the third position.

In some embodiments, a portion of the handle may be lowerable in order to make it easier for an operator to move the mounting rack between its respective positions (particularly from the first to the second position, where the mounting rack will be at a height which is higher than the automobile's roof). In some embodiments, the handle (or a portion thereof) may be telescopically extendable. In some embodiments, the handle (or a portion thereof) may be telescopically extendable from the mounting rack.

In some embodiments, the handle may comprise a mechanical advantage which operates when initially moving the mounting rack out of the first position. Such a mechanical advantage may help to overcome the initial force required to start to move the mounting rack, and especially when it is loaded with heavy articles.

In some embodiments, the roof rack may comprise a lock (e.g. a latch) for preventing the at least two cross bars from extending into their extended configurations. The lock may, for example, be a lever that is moveable between open and closed positions. In some embodiments, the lock may be configured to visually indicate whether the cross bars are locked, providing an important safety function.

In a second aspect, the present invention provides a kit of parts for assembling the roof rack of the first aspect of the present invention.

In a third aspect, the present invention provides a method for loading articles onto a roof rack. The roof rack comprises a plurality of roof attachments that attach the roof rack to a roof of an automobile; at least two cross bars that are arranged across the roof of the automobile, each cross bar comprising a plurality of members configured to move relative to each other such that the cross bar is extendable into an extended configuration in which a portion of the cross bar would overhang a side of the automobile; a mounting rack configured to receive articles on an upper portion thereof, the mounting rack being mounted to the at least two cross bars in a spaced relationship thereto, whereby extending the at least two cross bars into their extended configurations moves the mounting rack between a first position where it overlies the roof of the automobile and a second position where it overhangs the side of the automobile, wherein the mounting rack is mounted to a member of the at least two cross bars which is the last to move into a position overhanging the side of the automobile; a pivot that is not operable until the mounting rack is in the second position, the mounting rack being pivotable between the second position and a third position where the mounting rack is adjacent the side of the automobile with the upper portion facing away from the side of the automobile for loading or unloading of the articles; and a ground engaging portion configured to engage the ground when the mounting rack is in the third position. The method comprises the steps of: if not already, moving the mounting rack into the third position; carrying the article to the side of the automobile; loading the article onto the upper portion of the mounting rack; pivoting the mounting rack from the third position to the second position; and moving the mounting rack from the second position to the first position.

In some embodiments of the third aspect of the present invention, the roof rack may be the roof rack of the first aspect of the present invention.

In a fourth aspect, the present invention provides a method for unloading articles from a roof rack. The roof rack is the same roof rack as that recited for the method of the third aspect of the present invention. The method comprises the steps of: moving the mounting rack from the first position to the second position; pivoting the mounting rack from the second position to the third position; and unloading the article from the upper portion of the mounting rack.

Additional features and advantages of the various aspects of the present invention will be described below in the context of specific embodiments. It will be appreciated, however, that such additional features may have a more general applicability in the present invention than that described in the context of these specific embodiments.

BRIEF DESCRIPTION OF DRAWINGS

Embodiments of the present invention will be described in further detail below with reference to the following drawings, in which.

DESCRIPTION OF EMBODIMENTS

Figure 1:
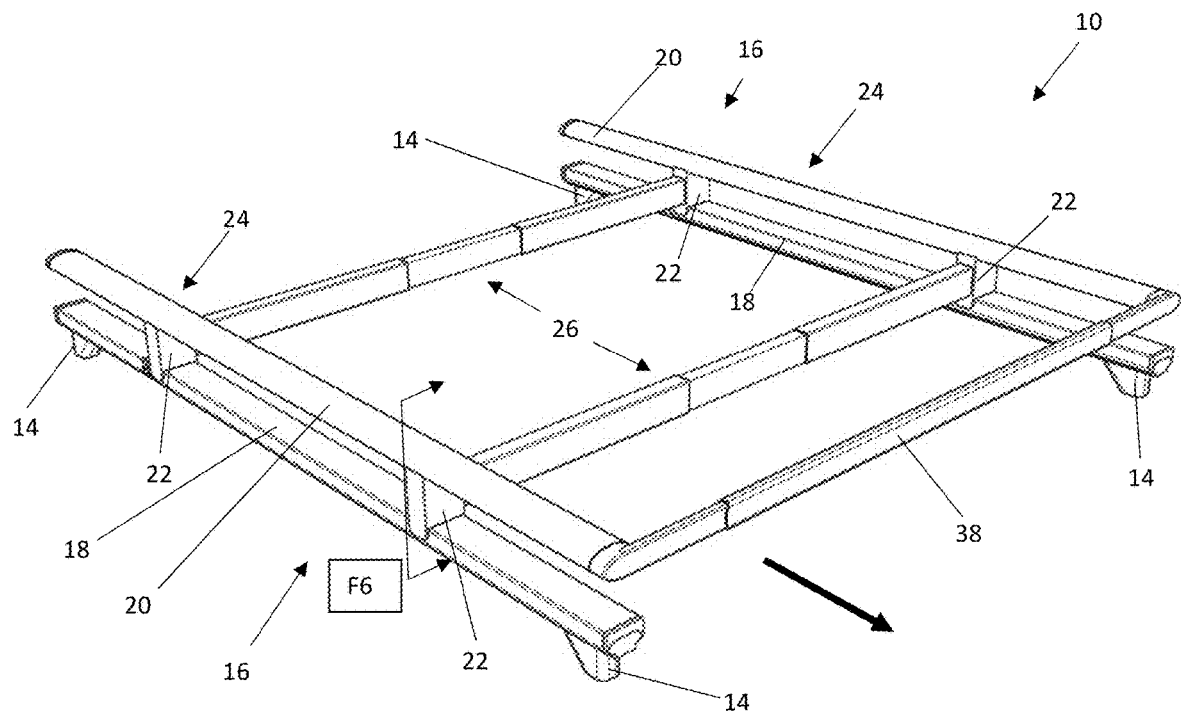
FIG. 1 shows a perspective view of a roof rack in accordance with an embodiment of the present invention.

As noted above, the overarching purpose of the present invention is to simplify the ease with which articles can be loaded and unloaded from a roof rack. Thus, the present invention provides a roof rack comprising a plurality of roof attachments for attaching the roof rack to a roof of an automobile; at least two cross bars that are arrangeable across the roof of the automobile, each cross bar comprising a plurality of members configured to move relative to each other such that the cross bar is extendable into an extended configuration in which a portion of the cross bar would overhang a side of the automobile; a mounting rack configured to receive articles on an upper portion thereof, the mounting rack being mounted to the at least two cross bars in a spaced relationship thereto, whereby extending the at least two cross bars into their extended configurations moves the mounting rack between a first position overlying (i.e. when the roof rack is on the automobile's roof) the roof of the automobile and a second position overhanging the side of the automobile, wherein the mounting rack is mounted to a member of the at least two cross bars which is the last to move into a position overhanging the side of the automobile; a pivot that is not operable until the mounting rack is in the second position, the mounting rack being pivotable between the second position and a third position where the mounting rack is adjacent the side of the automobile with the upper portion facing away from the side of the automobile for loading or unloading of the articles; and a ground engaging portion configured to engage the ground when the mounting rack is in the third position.

The present invention also provides a kit of parts from which the roof rack of the present invention may be assembled.

In the following description of the invention, the roof rack will usually be described in the context of it being mounted on the roof of an automobile. It is to be appreciated, however, that such a positional description is given in order to describe the roof rack and to give context to its advantages when in use. The present invention relates to the roof rack per se (as well as to its use), and does not encompass the automobile on which the roof rack is mounted.

In the following description of the invention, the roof rack will usually be described in the context of its mounting rack overhanging the left and/or right side of the automobiles (typically the left hand side of the automobile in countries such as Australia, where the left hand side of a parked automobile is adjacent to the pavement). It is to be appreciated, however, that the mounting rack may be readily adapted from that described herein to overhanging the rear side of an appropriately shaped automobile (e.g. a 4 four wheel drive).

The roof rack of the present invention may be configured to receive any one or more suitable articles. For example, the roof rack may be configured to receive any one or more articles independently selected from the group consisting of: bicycles, kayaks, canoes, boats, skis, snowboards, jerry cans, gas cylinders and luggage. Components that can be used to securely attach the articles listed above to roof racks are commercially available and would be familiar to persons skilled in the art. Typically, each article will have a specific component (although similar components may be used for kayaks and canoes, for example) which may be provided either as part of the upper portion of the mounting rack or adapted to be connected to the mounting rack's upper portion.

The roof rack of the present invention comprises a plurality of roof attachments for attaching the roof rack to a roof of an automobile. Such roof attachments are commercially available and would be familiar to persons skilled in the art. Typically, different automobiles have different roof configurations, so the roof attachments may need to be provided in a number of forms compatible for use with different automobiles. Providing roof attachments suitable for use on any given automobile is within the ability of a person skilled in the art.

Any configuration of components which would securely position the mounting rack with respect to the roof attachments (and hence the automobile's roof, in use) whilst still enabling the functionality described herein may be used. Typically, the cross bars would be used to securely position the mounting rack with respect to the roof attachments. In some embodiments, for example, the at least two cross bars may be arrangeable transversely across the roof of the automobile between opposing roof attachments, with the mounting rack mounted thereon in the manner described below.

The roof rack will require at least two roof attachments in order to attach the roof rack to the automobile's roof. The number of roof attachments will depend on factors such as the size of the roof rack and size of the articles to be mounted thereon. Typically, the roof rack would comprise four roof attachments (two spaced apart roof attachments on each side of the automobile's roof), as is the case for the vast majority of conventional roof racks.

The roof rack may be adapted for attachment to the roof of any suitable automobile, including cars of all styles (e.g. sedans, saloons, station wagons, utes, including utes with or without canopies, and four wheel drive vehicles), trucks, trailers, etc. Basically, the roof rack of the present invention would be capable of use with any vehicle onto which a conventional roof rack can be fitted.

The roof rack of the present invention also comprises at least two cross bars that are arrangeable across the roof of the automobile. Each cross bar comprises a plurality of members configured to move relative to each other such that the cross bar is extendable into an extended configuration in which a portion of the cross bar would overhang the side of the automobile. In some embodiments, the cross bars may be configured to extend transversely across the roof of the automobile in use (as is usually the case for conventional roof racks).

The members of each cross bar may be configured to move relative to each other using any suitable mechanism. Typically, the members will be configured to sideably move relative to each other (i.e. such that the overall length of the cross bar expands and contracts) because such a mechanism is relatively simple, whilst providing the required functionality. Some or all of the plurality of members of the cross bars may, for example, be telescopically extendable, in order for the cross bars to have the smallest possible footprint (which provides both aesthetic and functional advantages).

Appropriate bearings, bushes, etc. may be provided between the members of the cross bars in order to reduce the friction therebetween. Typically, bearings would be used in order to provide a smooth sliding movement, irrespective of the weight that may be being carried by the roof rack.

The roof rack of the present invention also comprises a mounting rack configured to receive articles on an upper portion thereof. The mounting rack is mounted to the at least two cross bars in a spaced relationship thereto, whereby extending the at least two cross bars into their extended configurations moves the mounting rack between a first position where it would overlie the roof of the automobile (i.e. when the roof rack is on the automobile's roof) and a second position where it would overhanging the side of the automobile. The mounting rack is mounted to a member of the at least two cross bars which is the last to move into a position overhanging the side of the automobile.

The mounting rack may take any form that is capable of achieving the functions described herein, primarily that is has an upper portion adapted for receipt of articles such as bikes, kayaks, etc. thereat, and that it be moveable and pivotable between its first, second and third positions. In a relatively simple form, for example, the mounting rack may have one or two bars, onto which can be received (via suitable attachments) articles such as kayaks and bicycles. In a relatively complex form, for example, the mounting rack may have one or two bars and a basket or cage, into which can be received articles such as luggage and gas cylinders. Typically, the mounting rack will include the minimum number of components in order to minimise the weight and bulk (and hence wind resistance) of the overall roof rack.

As noted above, components for attaching articles to the mounting rack's upper portion will depend on the article to be attached. Such components are known in the art and have been used extensively with conventional roof rack systems for some time, and are therefore not generally described here in further detail.

The mounting rack is mounted to the at least two cross bars in a spaced relationship thereto. This spacing can enable tie downs and the like to be wrapped around the mounting rack in order to securely affix articles thereto without affecting the functionality of the roof rack. As would be appreciated, movement of the mounting rack between its respective positions would be hindered if tie downs were wrapped around the cross bars and/or roof attachments (as is the case for some existing roof racks), and one of the primary advantages of the present invention is that the mounting rack and articles are both clearly visible when mounting the article on the roof rack. In effect, the mounting rack in its entirety, including the articles and tie downs etc. thereon, moves in the manner described herein.

The mounting rack may be mounted to one (or more) of the cross bars' members in any suitable manner. In some embodiments, the mounting rack may comprise at least two mounting rails, each mounting rail being mounted to a respective cross bar in a spaced relationship thereto. The mounting rack is mounted to a member of each cross bar which is the last to move into a position overhanging the side of the automobile, as this delays for as long as possible the full weight of the mounting rack (and any articles thereupon) being moved from above the automobile to overhanging its side (after which significant torsional forces will be exerted on the roof rack). The advantages of this configuration will be apparent and further emphasised in the specific embodiments described below.

In use, the mounting rack can be moved between a first position overlying the roof of the automobile and a second position overhanging a side of the automobile. The mounting rack is typically configured to move substantially horizontally between its first and second positions, as this would usually be the simplest mode of operation. Given that articles on the roof rack may weigh a considerable amount, any significant lifting of the mounting rack during its movement between the first and second positons (even if a mechanical advantage was useable) would likely require considerable effort. Further, any downward movement of the mounting rack during this movement would carry with it the risk of an uncontrollable movement, which might cause injury to the operator and/or damage to the automobile or an adjacent item.

The roof rack of the present invention also comprises a pivot that is not operable until the mounting rack is in the second position. This advantageously provides a safety feature whereby the downward pivoting movement (described in further detail below) cannot occur until such time as the mounting rack is clear of the side of the vehicle and into a position where a user should be better able to support its weight. Some existing roof racks with a pivoting function have a pivot which is operable immediately upon sliding the roof rack outwardly, which may result in a less controllable operation, increase the risk of injury to the operator and/or increase the risk of vehicle damage.

In some embodiments, the pivot may include a release mechanism which must be released before the mounting rack can pivot between the second and third positions. Alternatively (or in addition), the pivot may be physically unable (or otherwise restrained) to pivot until it reaches a certain position (e.g. the second position). Specific forms of such a release mechanism will be described in further detail below in the context of specific embodiments of the roof rack.

Although the singular term "pivot" is typically used herein, it is to be understood that the pivot in the roof rack of the present invention may, in some embodiments, be provided in the form of two or more pivots. Operation of the pivot (or pivots) causes the mounting rack to pivot between its second position and a third position where the mounting rack would be adjacent the side of the automobile (i.e. the automobile upon which the roof rack is mounted) with its upper portion facing away from the side of the automobile in order to facilitate loading or unloading of articles thereon.

The pivot may take any form that is capable of providing the functionality described herein. The nature and location of the pivot in a roof rack of the present invention will depend on the other components of the roof rack, and the most appropriate form and location of the pivot for any given roof rack will readily be able to be determined by a person skilled in the art based on the teachings contained herein. Specific forms of the pivot will be described below in further detail in the context of specific embodiments of a roof rack in accordance with the present invention. Such forms of the pivot are, however, not intended to be limiting on the invention in its general sense.

As would be appreciated, regardless of the configuration of other components of the roof rack, the pivot must be located in a position and have a form that precludes any contact between the moving parts of the roof rack with the automobile during normal movement of the mounting rack from the second to the third positions.

In use, once in the second position (i.e. overhanging the automobile's side), the mounting rack is ready to be pivoted into its third position. This pivoting movement is enabled by the roof rack's pivot, which may, in embodiments of the roof rack which include cross bars having the form described herein, be provided in or at a member of each cross bar that would overhang the side of the automobile when in the extended configuration. The pivot may, for example, be provided in the form of a hinge in one of the members of each cross bar, but other forms of the pivot would also be possible. The pivot may, for example, be provided at or in the same member of each cross bar that the mounting rack is mounted to.

In some embodiments, the cross bars may themselves be joined together. For example, a longitudinal member (or members) may be provided in the form of a web between the cross bars in order to strengthen the roof rack (especially with respect to torsional forces) and make it generally easier to handle (as it can make the roof rack a single component). In order to provide the greatest degree of adaptability of fitting a roof rack to an automobile, such longitudinal member(s) would usually have an adjustable length (e.g. be telescopically extendable).

The roof rack of the present invention also comprises a ground engaging portion configured to engage the ground when the mounting rack is in the third position. As noted above, such a ground engaging portion may advantageously reduce the mechanical strain experienced by the roof rack, stabilise the mounting rack for loading and unloading articles thereon, as well as ensure that the mounting rack cannot pivot so far as to risk physically contacting the side of the car.

The roof rack of the present invention may also include other components which may impart advantageous features or functionality to the roof rack, provided that such components do not detrimentally affect its core functionality. Specific additional components will be described below.

The roof rack may, for example, also include a handle via which an operator can move the mounting rack between the first, second and third positions. Such a handle may take any suitable form, for example, as a bar that extends between the ends of the cross bars or mounting rack described herein (e.g. as described in further detail below) or as spaced apart hand grips located on the cross bars or mounting rack. The handle may, for example, be positioned at a distal end of the roof rack from the pivot in order to minimise the weight of the mounting rack (and any articles thereon) felt by the operator (i.e. due to the longest possible "lever" being used).

As the handle is likely to be located at a height above the roof of the automobile, where it may be a little unwieldy to operate (e.g. for a short person or where the articles carried on the roof rack are heavy), it might be advantageous if the handle (or a portion thereof) was lowerable in use. As would be appreciated, lowering the handle may make it easier for the operator to move the mounting rack, and especially from the first to second positions (and vice versa).

It should not be possible for the mounting rack (and any articles loaded thereon) to be able to move from their position above the automobile's roof during transit. The roof rack may therefore also include a lock (e.g. a latch), for example, a lock that is configured to prevent the cross bars from extending into their extended configuration, thereby effectively locking the mounting rack in the first position. Such a lock may simply hold the mounting rack in position such that it cannot move without a positive action by the operator, or may provide a security function if a key or combination is required in order to actuate the latch and hence move the mounting portion.

The lock may be provided in any form suitable to achieve the purpose described herein. The lock may, for example, be provided in the form of a lever that is moveable between open and closed positions. In some embodiments, the lock may be configured to visually indicate whether the mounting rack is locked in the first position. For example, the lock may overhang the side of the automobile when unlocked, or may include visual indicia such as a vividly coloured portion that can clearly be seen when the lock is unlocked.

The handle may also be configured to provide a mechanical advantage which operates when initially moving the mounting rack from the first position. For example, the handle may include components such as a cam member or pivot points which, upon initial movement of the handle, utilise a mechanical advantage to start movement of the mounting rack from the first to second positions. As would be appreciated, once it has commenced moving, less effort would be required to keep the mounting rack moving towards its second position.

In some embodiments, the handle may define the ground engaging portion when the mounting rack is in the third position. Such an embodiment of the present invention will be described in further detail below.

As would be appreciated, other components used with conventional roof racks may also be used with the roof rack of the present invention. Such other components and their functionality would be familiar to persons skilled in the art.

The components of the roof rack of the present invention may be made from any suitable material or combination of materials, the selection of which would also be well-known to persons skilled in the art.

The present invention also provides methods for loading and unloading articles onto and off from a roof rack. The roof rack comprises a plurality of roof attachments that attach the roof rack to a roof of an automobile; at least two cross bars that are arranged across the roof of the automobile, each cross bar comprising a plurality of members configured to move relative to each other such that the cross bar is extendable into an extended configuration in which a portion of the cross bar would overhang a side of the automobile; a mounting rack configured to receive articles on an upper portion thereof, the mounting rack being mounted to the at least two cross bars in a spaced relationship thereto, whereby extending the at least two cross bars into their extended configurations moves the mounting rack between a first position where it overlies the roof of the automobile and a second position where it overhangs the side of the automobile, wherein the mounting rack is mounted to a member of the at least two cross bars which is the last to move into a position overhanging the side of the automobile; a pivot that is not operable until the mounting rack is in the second position, the mounting rack being pivotable between the second position and a third position where the mounting rack is adjacent the side of the automobile with the upper portion facing away from the side of the automobile for loading or unloading of the articles; and a ground engaging portion configured to engage the ground when the mounting rack is in the third position. The loading method comprises the steps of: if not already, moving the mounting rack into the third position; carrying the article to the side of the automobile; loading the article onto the upper portion of the mounting rack; pivoting the mounting rack from the third position to the second position; and moving the mounting rack from the second position to the first position. The unloading method comprises the steps of: moving the mounting rack from the first position to the second position; pivoting the mounting rack from the second position to the third position; and unloading the article from the upper portion of the mounting rack.

Figure 7:
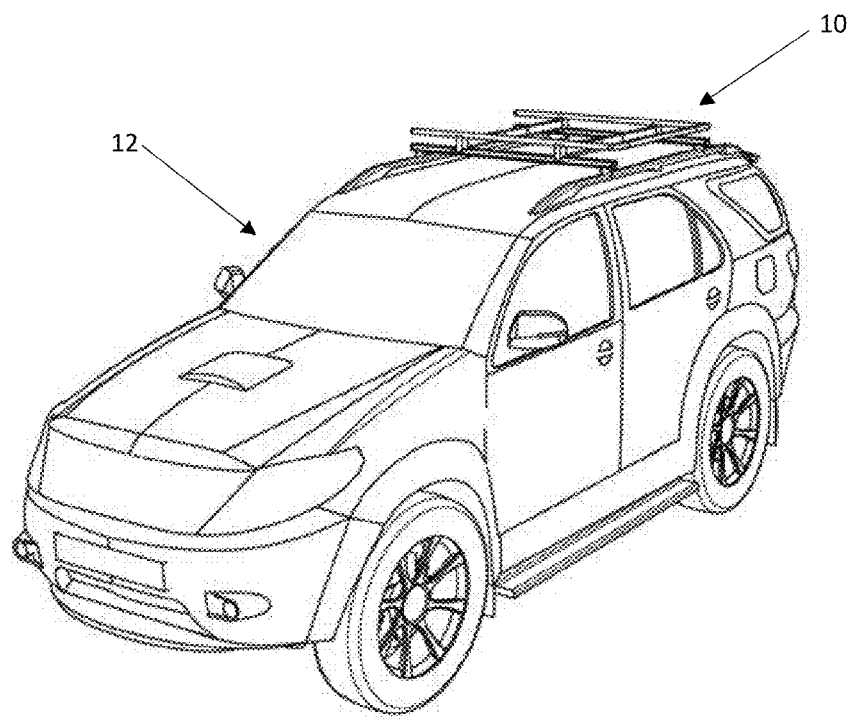
FIG. 7 shows a perspective view of a car with the roof rack of FIG. 1 on its roof.

Specific embodiments of the present invention will now be described with reference to the accompanying drawings. Referring firstly to FIGS. 1 to 5, a roof rack in accordance with an embodiment of the present invention is shown in the form of roof rack 10. Roof rack 10 is configured to be mounted securely onto the roof of an automobile in the form of a car 12 (see FIG. 7, for example) via four roof attachments in the form of roof mountings, shown generally as 14. Roof mountings 14 are attachable to the lateral edges of the roof of car 12 in a conventional manner that will not be described herein.

Roof rack 10 also has two rail assemblies 16, 16, which are configured to transversely span the roof of car 12. The rail assemblies 16, 16 are identical (in this embodiment) and only one will be described below in detail. Rail assembly 16 has a cross bar shown in the form of lower bar 18, which is joined to a mounting rack shown in the form of upper bar 20. Lower bar 18 and upper bar 20 have similar lengths. An underside of lower bar 18 is attached at opposite ends thereof to roof mountings 14, 14, and hence to the roof of the car 12. An upper side of lower bar 18 is attached to an underside of upper bar 20 by struts 22, 22, with a space defined therebetween through which tie downs and the like (not shown) can be passed through in order to wrap around upper bar 20 or struts 22. An upper side of upper bar 20 provides a mounting portion 24, which may include conventional fittings (described below, see FIGS. 9 and 10) configured to securely mount articles to the mounting portions 24, 24.

Rail assemblies 16, 16 are joined by telescopic members 26, 26, each of which joins a strut 22 of one of the rail assemblies 16 to the corresponding strut 22 of the other rail assemblies 16. Telescopic members 26, 26 may be expanded or contracted in order for the roof rack 10 to be adjustable to best fit a specific car 12, or to carry a specific article (e.g. longer articles may require a greater distance between mounting portions 24 and 24). Telescopic members 26, 26 also impart rigidity to the roof rack 10, which may help in circumstances where a high torsional force is being experienced by the roof rack 10, as will be described below.

Figure 6:
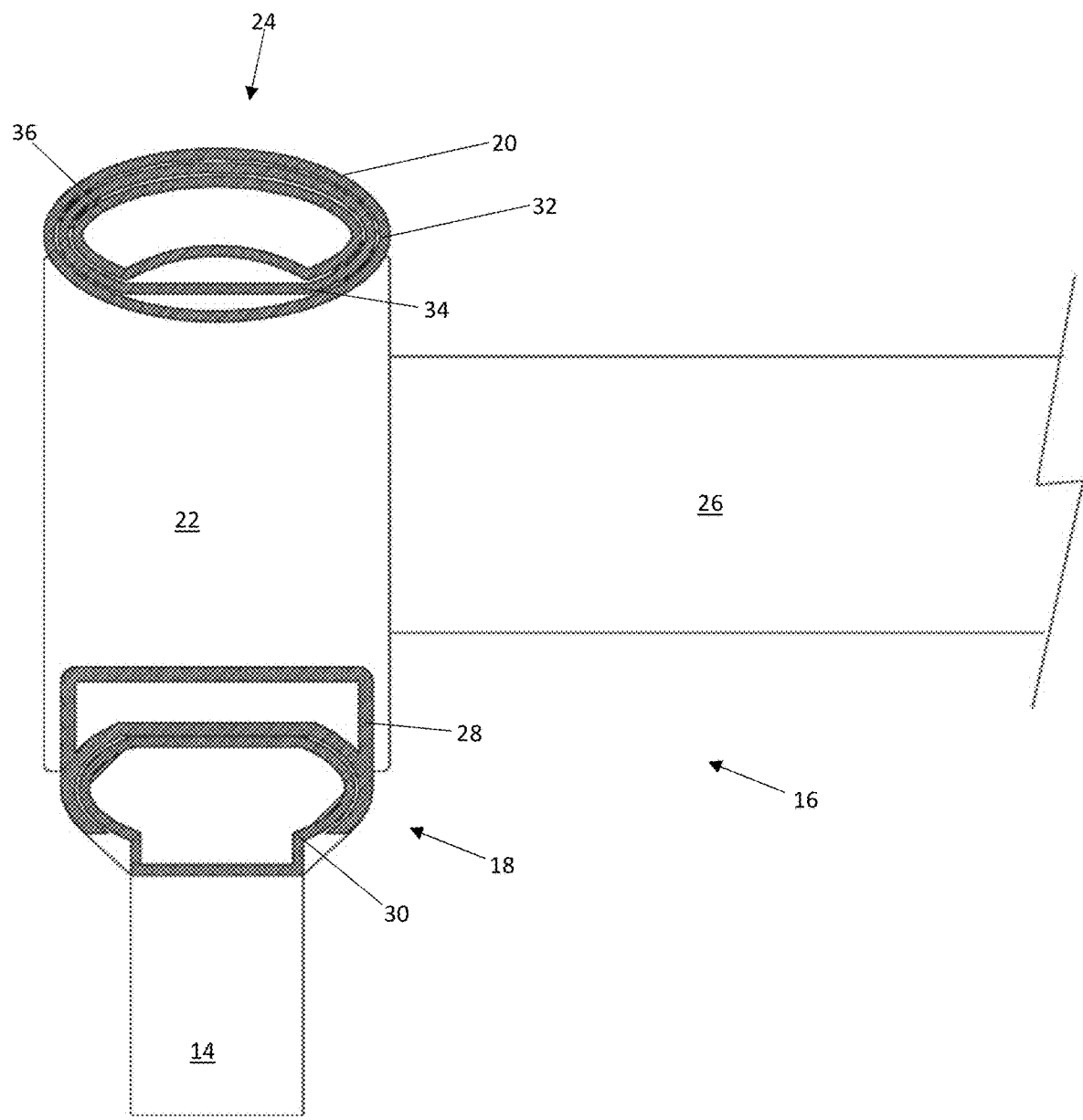
FIG. 6 shows a cross sectional view of part of the roof rack of FIG. 1.

Referring now to FIG. 6, shown is a cross sectional view of rail assembly 16 at the section marked F6 (in FIG. 1), in which the internal structure of the lower 18 and upper 20 bars can be seen. Lower bar 18 comprises an outer sheath 28 and an inner rail 30. Inner rail 30 is attached to the roof mountings 14, 14 at its underside, and has an upper profile that substantially conforms with, and is slidably receivable within, a lower profile of outer sheath 28. The lower profile of outer sheath 28 includes return portions at opposite edges thereof, thereby ensuring that there is no way outer sheath 28 and inner rail 30 can move in anything other than a sliding lateral (with respect to car 12) relationship (i.e. they cannot be decoupled in the event of an accident or a sudden stop, etc.). The upper portion of outer sheath 28 may have any shape suitable for securely receiving struts 22, 22 thereon and is shown here in a substantially planar form.

Although not shown, bearings may be provided between outer sheath 28 and inner rail 30 in order to provide a smooth sliding relationship therebetween (bearing in mind that the entire weight of the roof rack and any articles thereon will be brought to bear against this junction).

Upper bar 20 has three generally elliptically-shaped members that are configured to telescopically slide with respect to each other in the manner described below. The outermost member 32 defines an exterior of the upper bar 20 and mounting portion 24, and is attached to struts 22, 22 at a lower portion thereof. Outermost member 32, struts 22, 22 and outer sheath 28 of the lower bar 18 are therefore in a fixed relationship with each other in the roof rack 10, which provides the tie down advantages described earlier. Upper bar 20 also includes a middle rail 34 and an innermost rail 36, the function of which will be described below.

Any suitable method may be use to ensure that the outer sheath 28 and inner rail 30, and outermost member 32, middle rail 34 and innermost rail 36 slide smoothly with respect to one another. For example, the outermost member 32, middle 34 and innermost 36 rails may be separated with a bush (e.g. a nylon bush) in order to provide a smooth sliding relationship therebetween (not shown).

Referring again to FIG. 1, a handle is also provided in the form of telescopically extendable handle bar 38, which is attached at its opposing ends to the end of innermost rails 36, 36.

Figure 2:
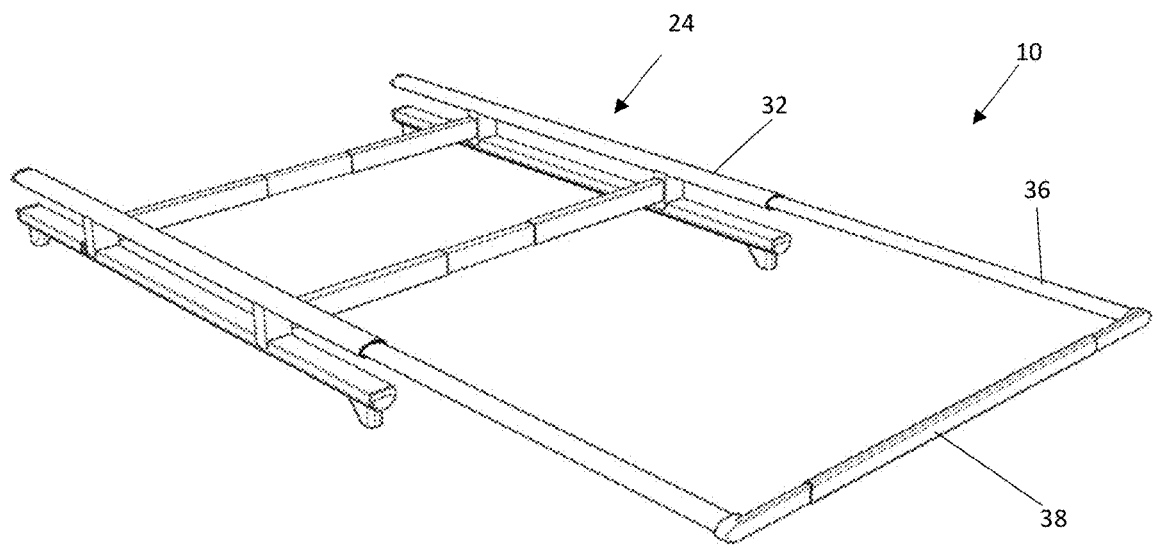
FIG. 2 shows the roof rack of FIG. 1 in a partially extended configuration.
Figure 3:
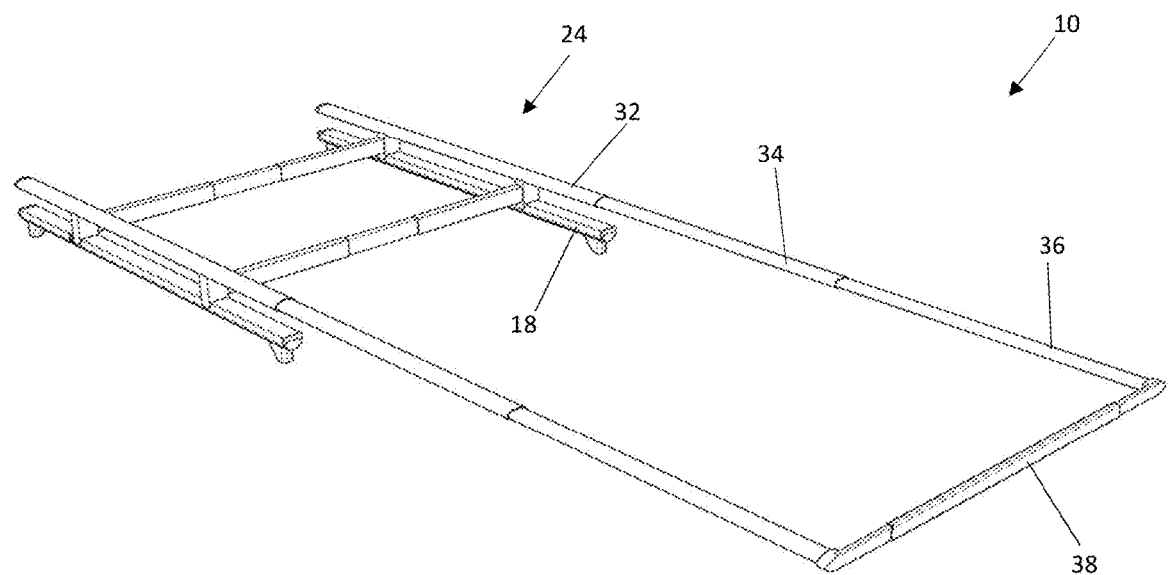
FIG. 3 shows the roof rack of FIG. 1 in a partially extended configuration.
Figure 4:
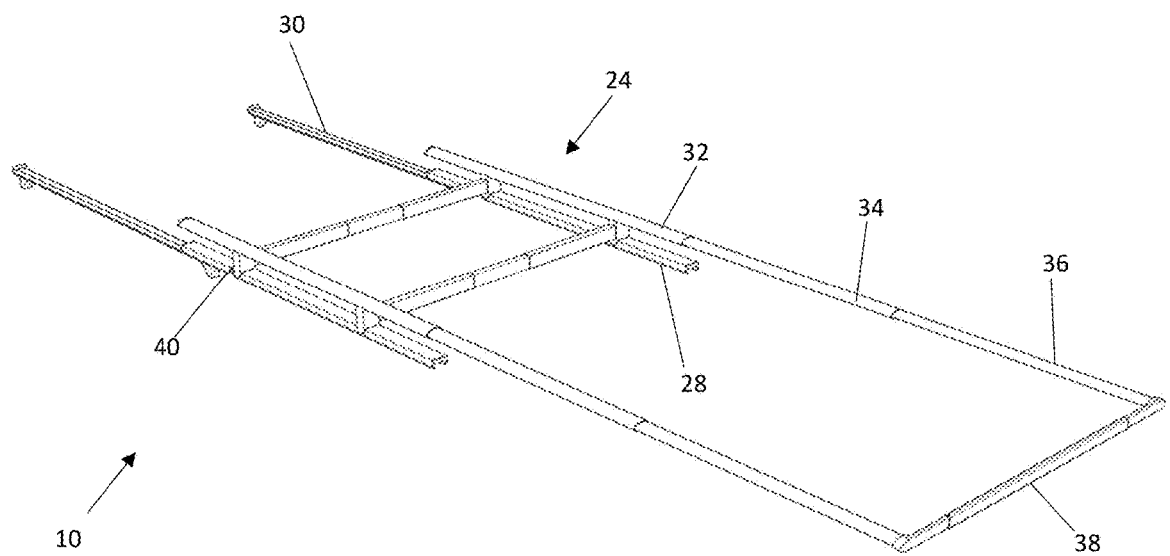
FIG. 4 shows the roof rack of FIG. 1 in an extended configuration.
Figure 5:
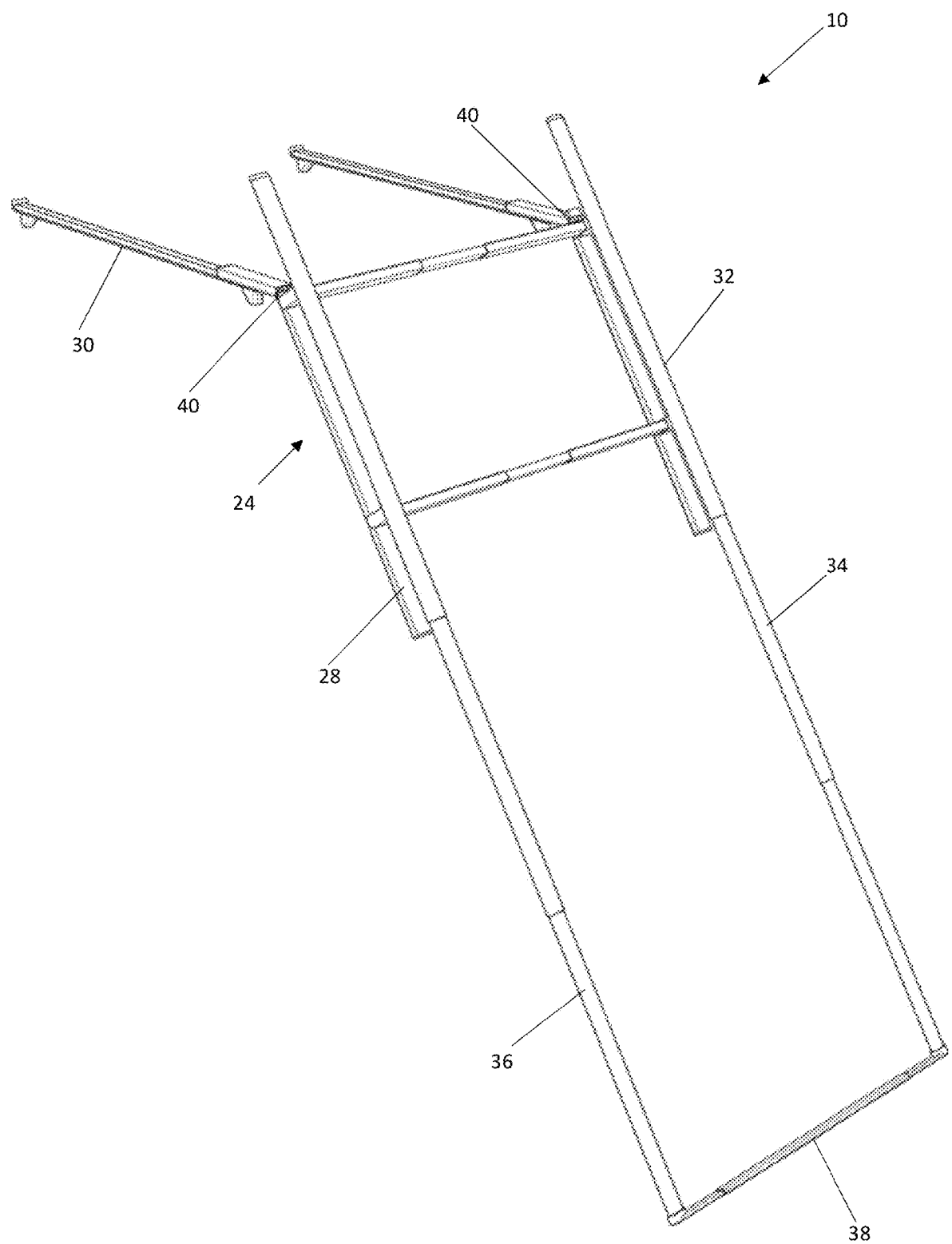
FIG. 5 shows the roof rack of FIG. 1 in an extended and pivoted configuration, ready for articles to be loaded thereon.

The method via which the roof rack 10 may be deployed such that the mounting portions 24, 24 of roof rack 10 move from a first position (i.e. as shown in FIG. 1) to a second position (i.e. as shown in FIG. 4) and on to a third position (i.e. as shown in FIG. 5) will now be described. Firstly, an operator would grab the handle 38 and pull outwardly (i.e. in the direction of the arrow shown in FIG. 1). Although not shown in the Figures, the handle 38 would typically also include a locking mechanism which would prevent the handle 38 from moving in the direction of the arrow (the outer sheath 28 of the lower bar 18 may also be prevented from moving with respect to the inner rail 30 by the same locking mechanism or a separate locking mechanism), and the operator would therefore have to unlock the locking mechanism before they could move the handle 38 (etc.). Moving the handle 38 in the direction of the arrows causes the innermost rail 36 to slide out of middle rail 34, until such time as a maximum length of the innermost rail 36 has been extended (FIG. 2). At this time, a blocking means (not shown, but known in the art) causes the innermost rail 36 to engage with the middle rail 34, whereupon continuing to move the handle 38 away from the roof rack 10 (and roof of the car 12) causes the middle rail 34 to slide out of outermost member 32, until such time as a maximum length of the middle rail 34 has been extended (FIG. 3).

As the upper rail 20 is now fully extended, pulling the handle 38 further away from the roof rack 10 causes the upper bar 20 (which is attached via studs 22, 22 to the outer sheath 28 of the lower bar 18) to move with respect to the inner rail 30 of the lower bar 18, and hence extend the lower bar 18 and move the mounting portions 24, 24 of the roof rack 10 (and any articles mounted thereon) off the roof of the car 12 and into a position where the mounting portions 24, 24 laterally project out from the roof of the car 12 and overhang the side of the car 12 (see FIG. 4). In some embodiments, a lock may need to be actuated in order for the outer sheath 28 of the lower bar 18 to be able to move with respect to the inner rail 30.

Once in the position shown in FIG. 4 (i.e. the second position), hinges 40, 40 (see FIGS. 4 and 5) in outer sheaths 28, 28 have been slid off the inner rails 30, 30. Whilst positioned on the inner rail 30, the hinges 40, 40 were not physically capable of hingedly moving. However, once clear of the inner rails 30, 30 (i.e. as can be seen in FIGS. 4 and 5), the physical constraint that prevented this movement is no longer present and the hinges 40, 40 are able to downwardly hinge, as shown in FIG. 5. As would be appreciated, once in the configuration shown in FIG. 4 (i.e. where the pivoting movement can occur), the downwards force caused on the handle 38 due to the weight of the roof rack 10 and (more importantly) any articles mounted thereon would be significantly lower due to the combined length of (most of) outermost member 32, middle rail 34 and innermost rail 36 effectively providing a long lever between pivots 40, 40 and handle 38. It is therefore a relatively simple action for the operator to lower handle 38 to the ground (i.e. as shown in FIG. 5), where the handle 38 engages the ground and prevents further pivoting of the mounting portion 24, which might risk damaging the car 12.

Figure 8:
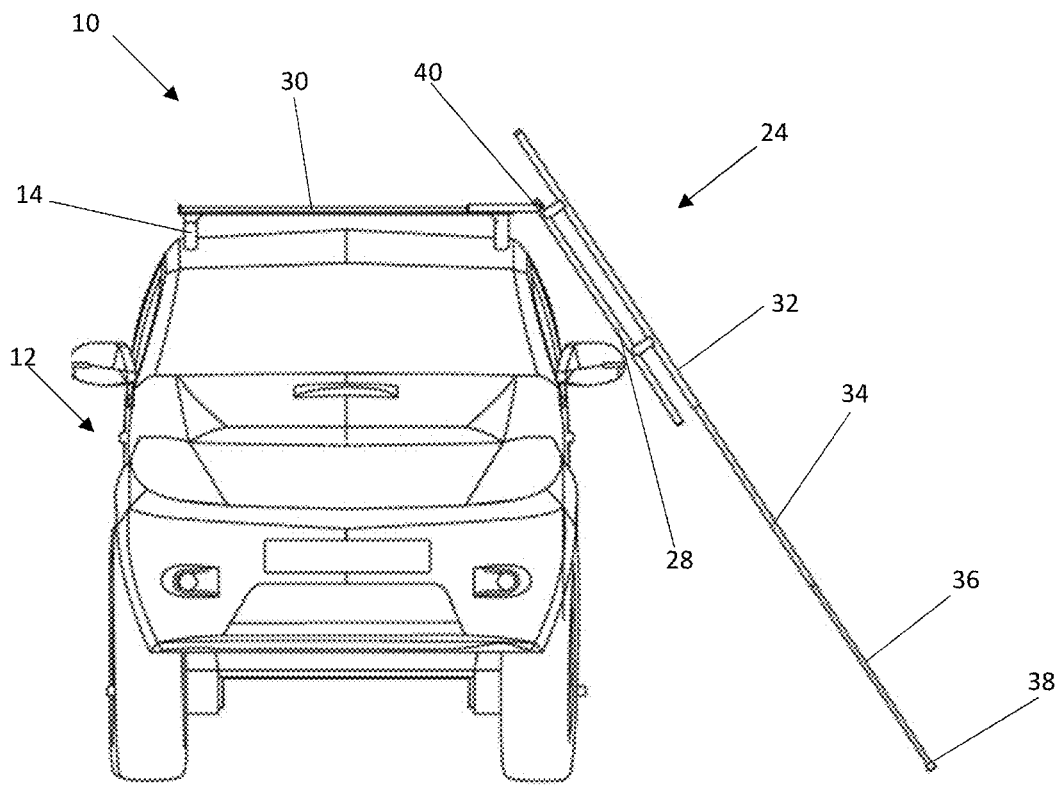
FIG. 8 shows an end view of the car and roof rack of FIG. 7, but in which the roof rack is in its extended and pivoted configuration.

As can be seen by reference to FIG. 8, the location of the pivots 40, 40 on their outer sheaths 28, 28, the amount by which the inner rails 30, 30 of the lower bars 18, 18 overhang the side of the car 12 and the distance of the handle 38 from the pivots 40, 40 all need to be considered in order to ensure that pivoting of the mounting portions 24, 24 of the roof rack 10 (i.e. from the position shown in FIG. 4 to that in FIG. 5) does not bring any part of the roof rack 10 into contact with the side of the car 12. The configuration of the roof rack 10 shown in FIG. 8 is very stable, with the ground-engaging handle 38 stabilising the mounting portions 24, 24, as well as reducing the amount of mechanical stress on the hinges 40, 40.

Figure 9:
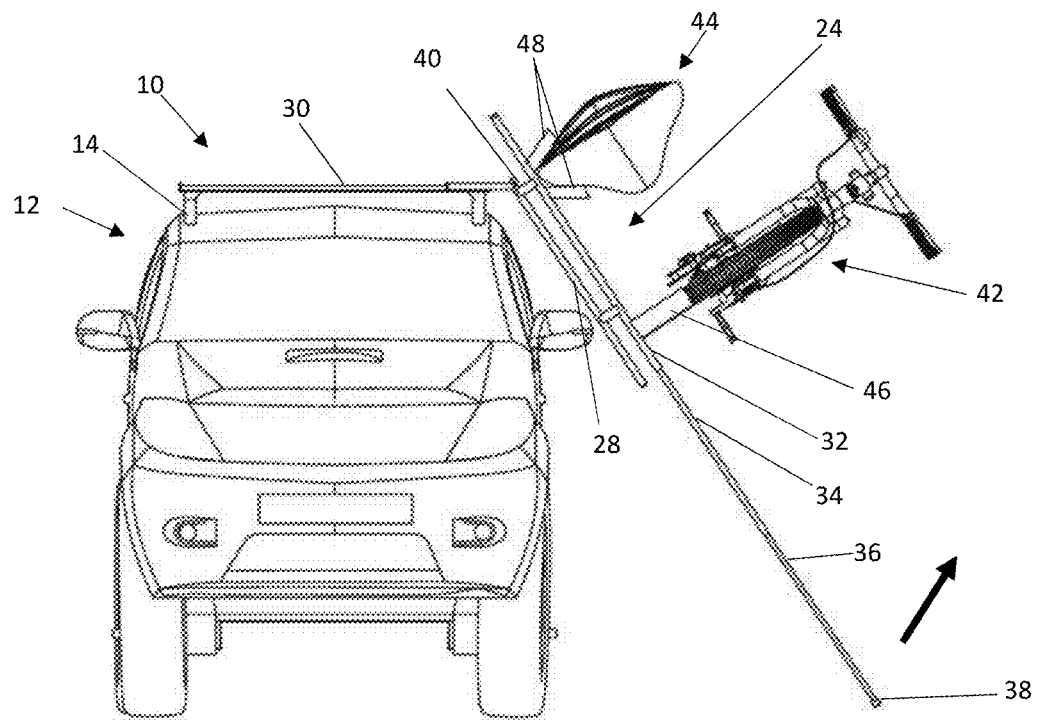
FIG. 9 shows an end view of the car and roof rack of FIG. 8, where a kayak and mountain bike have been mounted to the roof rack.

Once in the position shown in FIGS. 5 and 8, the mounting portions 24, 24 are presented to the operator for them to load articles such as mountain bikes 42 and kayaks 44 thereon (as shown in FIG. 9). As noted above, a variety of components are presently available for securely affixing articles such as bikes 42 and kayaks 44 to roof racks. For example, tyre engaging members 46, 46 (only one of which can be seen in FIG. 9) can be attached to mounting portions 24, 24 and used to securely engage the tyres of the bike 42 when on the roof rack 10. Similarly, v-shaped arms 48, 48 (only one of which can be seen in FIG. 9) can be attached to mounting portions 24, 24 and used to hold the kayak 44 in position on the roof rack 10 for it to be tethered in the conventional manner.

Presenting the mounting portions 24, 24 to the operator at the side of the car 12 provides a number of advantages. For example, it is only necessary to lift the kayak 44 to a height just above the side windows of the car 12 (or even lower if the kayak was to be positioned on the lower (in use) side of the roof rack 10) instead of to a height above the roof of the car 12. It is also easier to access the side of car 12 than its roof, which might require the operator to lean over the top of the car whilst carrying the heavy kayak 44, thereby placing the operator's back in a very vulnerable position. It is also much easier for the user to tether the kayak 44 to the mounting portions 24, 24 whilst in the position shown in FIG. 9, where the tethering straps (not shown) can easily be seen as they are wrapped around the upper bars 20, 20 and/or struts 22, 22 and/or telescopic members 26, 26 in a conventional manner. As would be appreciated, such tethering will not affect the functionality of the roof rack 10 described herein.

Figure 10:
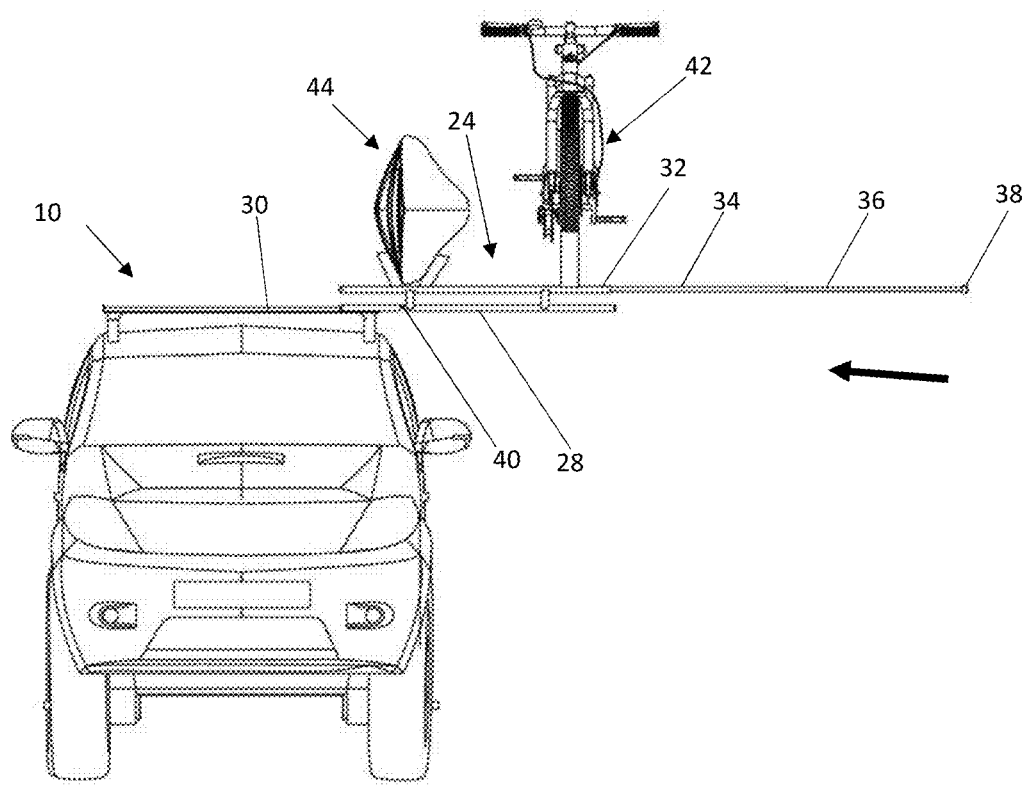
FIG. 10 shows an end view of the car and roof rack of FIG. 9, but in which the roof rack has been pivoted into its extended configuration.
Figure 11:
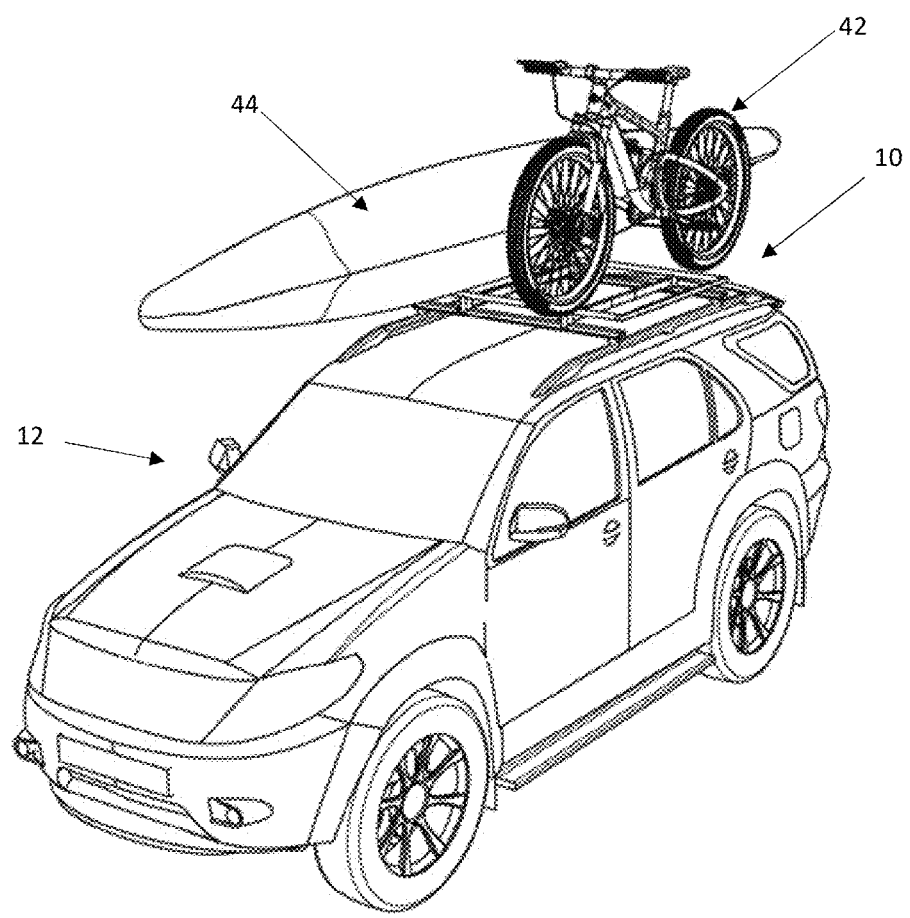
FIG. 11 shows a perspective view of the car of FIG. 9, with the roof rack and articles carried thereon in a configuration ready for driving.

Once the kayak 44 and bike 42 have been loaded onto the mounting portions 24, 24 of the roof rack 10, the operator simply reverses the process described above. In short, the operator would lift the handle 38 in the direction of the arrow shown in FIG. 9 until the mounting portions 24, 24 were again in their second (substantially horizontal) positions, as shown in FIG. 10, at which time pivots 40, 40 are straightened. Pushing the handle 38 in the direction of the arrow shown in FIG. 10 causes the outer sheath 28 of the lower bar 18 to slide back onto the inner rail 30, until such time as the outer sheath 28 completely covers the inner rail 30 and further relative movement cannot occur. In this position, the mounting portions 24, 24, bike 42 and kayak 44 are positioned directly over the roof of the car 12, as would be the case for a conventional roof rack. As would be appreciated, the pivots 40, 40 would very quickly slide back onto the inner rails 30, 30 and, once thereon, any pivoting force on the user would cease. The handle 38 is then pushed further towards the roof rack 10, causing the middle rail 34 and innermost rail 36 to progressively close until such time as the configuration shown in FIG. 11 is attained and the car 12 is ready for adventure. If a lock or latch is present, the handle 38 (and lower bar 18) would again be locked.

Figure 12:
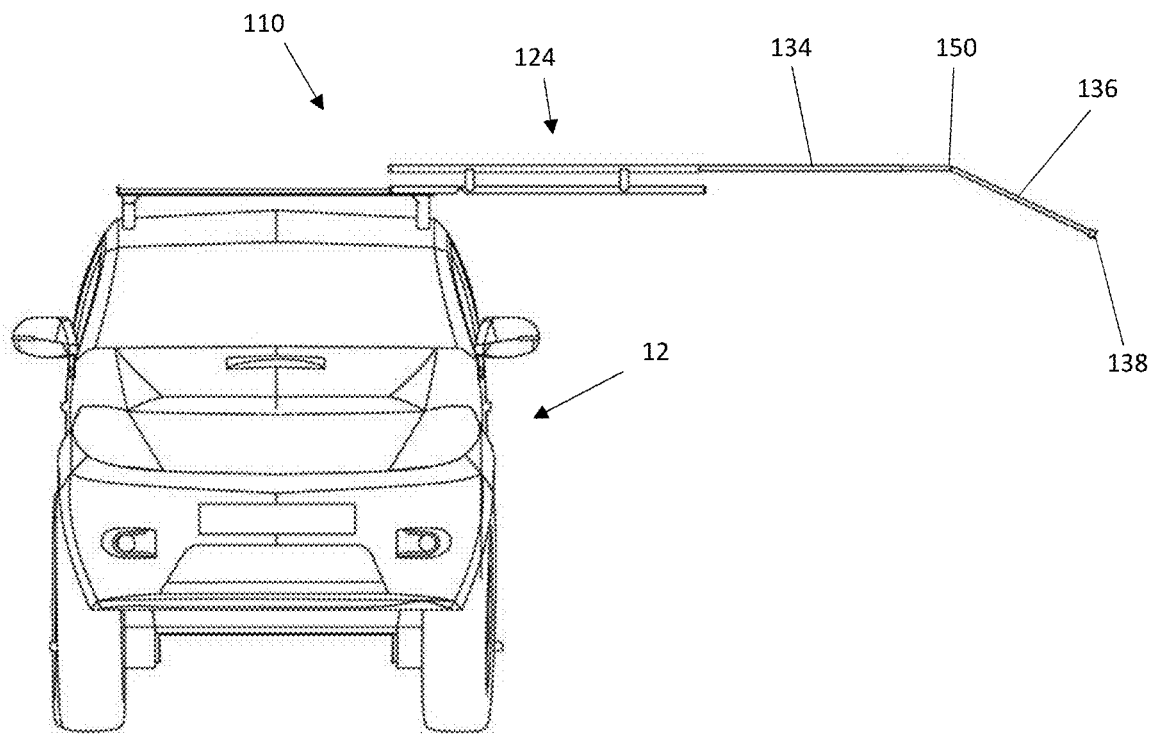
FIG. 12 shows a perspective view of a car and a roof rack in accordance with another embodiment of the present invention.
Figure 13:
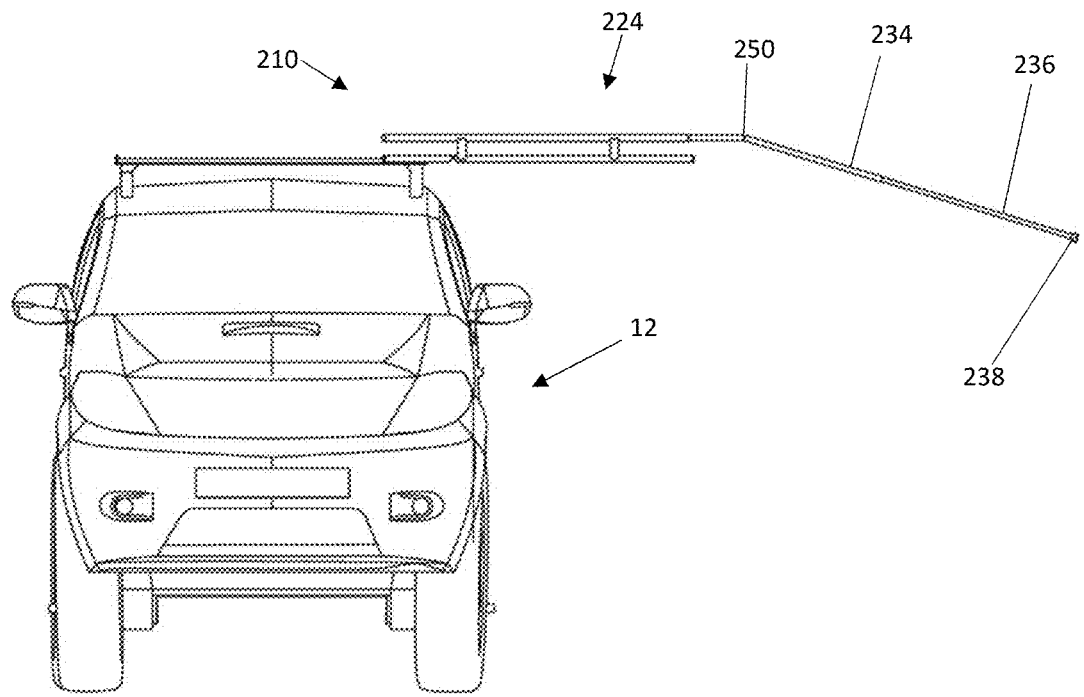
FIG. 13 shows a perspective view of a car and a roof rack in accordance with yet another embodiment of the present invention.

Referring now to FIGS. 12 and 13, shown are minor variants of the roof rack 10 described above. In these variants, an additional pivot point is provided in the form of hinge 150 (FIG. 12) or 250 (FIG. 13). In FIG. 12, hinge 150 is provided in innermost rail 136 extending from middle rail 134. In FIG. 13, hinge 250 is instead provided in middle rail 234. Hinges 150 and 250 provide the same function, namely to lower the height of handle 138, 238 (respectively) in order to make the task of pulling the mounting portion 124, 224 (respectively) from its first position to its second position easier for shorter operators. Once in the third position, the weight of the roof rack and any articles thereon will tend to straighten the hinge 150, 250, although a lock (e.g. a slidable sleeve) may be provided to prevent any chance of pivoting.

Referring now to FIGS. 14 and 15, shown are sequences of drawings depicting alterative deployment methods for the roof rack 10, which may be useful when the available space at the side of the car 12 is limited. Referring firstly to FIGS. 14A-14E and, in particular FIG. 14A, a car 12 is shown having a roof rack 10 on its roof. Roof rack 10 is as described above but, in this deployment scenario, the space at the side of the car 12 is not sufficient for the roof rack to be fully extended (i.e. in the manner shown in FIG. 4). The car 12 may, for example, be parked in a relatively tight driveway, or in a carpark with another car (not shown) parked next to it.

Figure 14A:
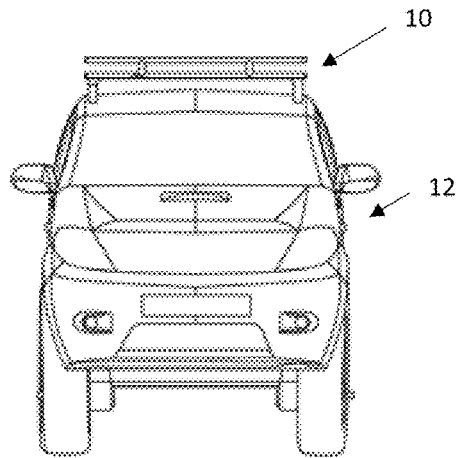
FIGS. 14A-14E show end views of the car and roof rack of FIG. 7, with the roof rack being shown to be operated in a second mode.
Figure 14D:
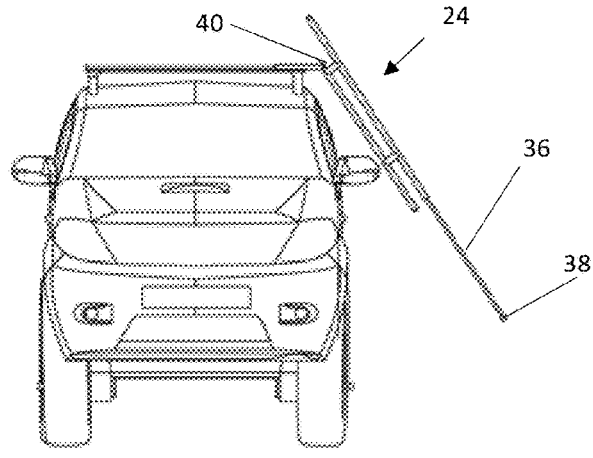
Figure 14B:
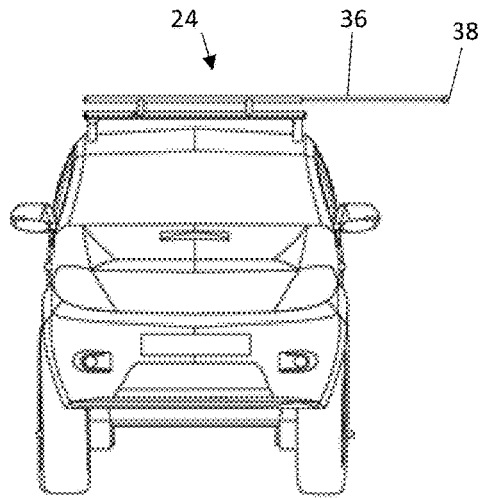
Figure 14E:
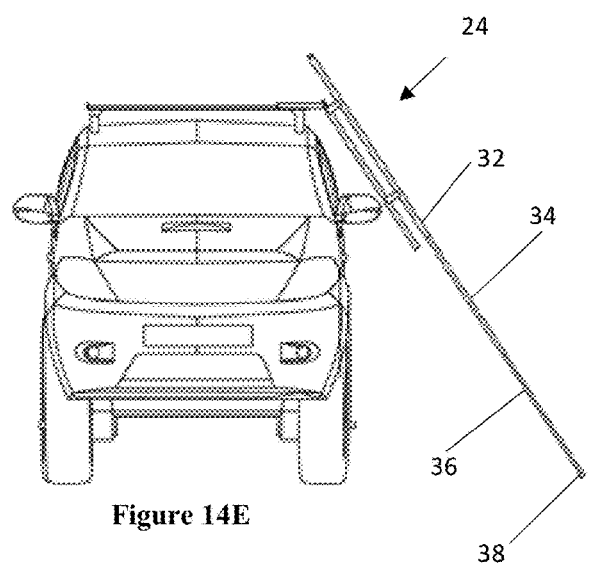
Figure 14C:
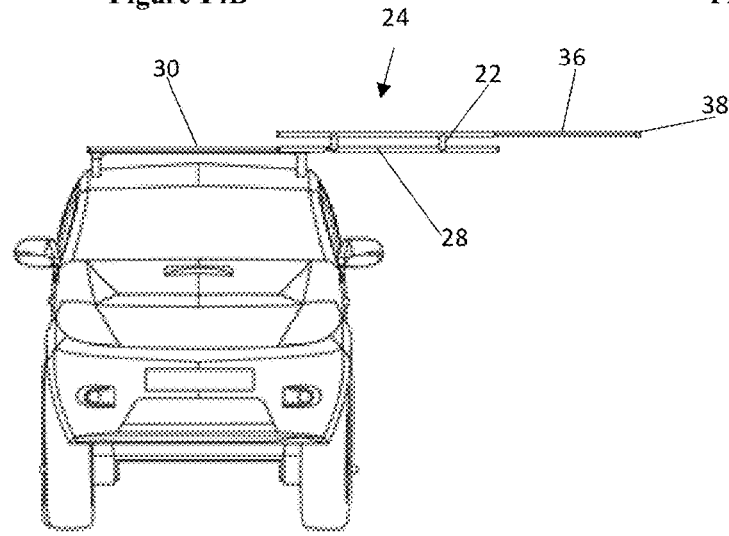

In use, an operator pulls on handle 38 until such time as innermost rail 36 (only) is fully extended. Middle rail 34 is, however, not extended out of outermost member 32, as was the case earlier, but instead further pulling of the handle 38 causes the upper bar 20 (which is attached via studs 22, 22 to the outer sheath 28 of the lower bar 18) to move with respect to the inner rail 30 of the lower bar 18. The mounting portions 24, 24 of the roof rack 10 are thus caused to move from their position above the roof of the car 12 (FIG. 14B) and into a position where the mounting portions 24, 24 laterally project out from the roof of the car 12 and overhang the side of the car 12 (FIG. 14C). Once in this position, the mounting portions 24, 24 can be pivoted via hinges 40, 40, in the manner described above, towards the third position. As can be seen from FIG. 14D, care needs to be taken during this step because if the user were to let go of the handle 38, then the extended roof rack 10 (in particular the outer sheath 28) might swing into the side of the car 12 and cause damage. Before this happens however, and as can be seen in FIG. 14E, the user would extend the handle 38 completely by pulling middle rail 34 out of outermost member 32, whereupon the configuration shown and described above in respect of FIG. 5 is achieved.

Figure 15A:
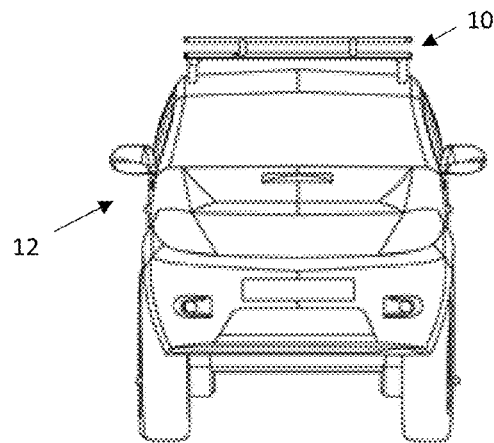
FIGS. 15A-15E show end views of the car and roof rack of FIG. 7, with the roof rack being shown to be operated in a third mode.
Figure 15D:
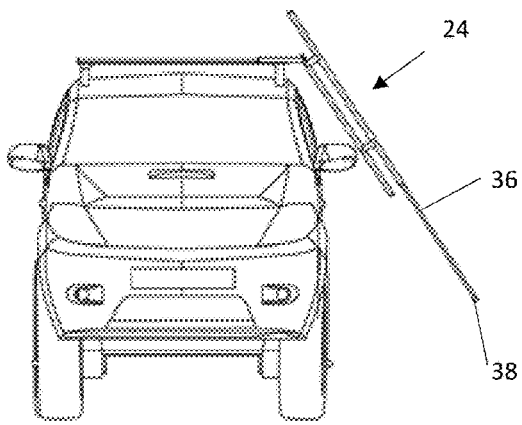
Figure 15B:
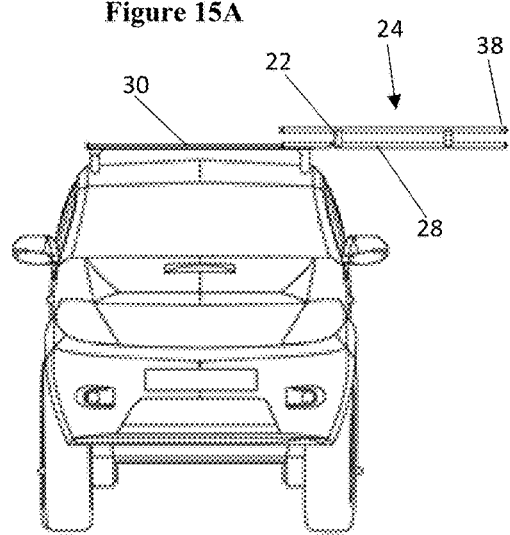
Figure 15E:
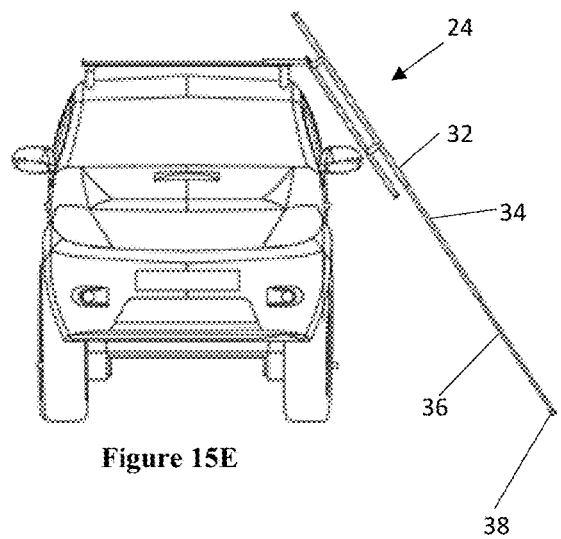
Figure 15C:
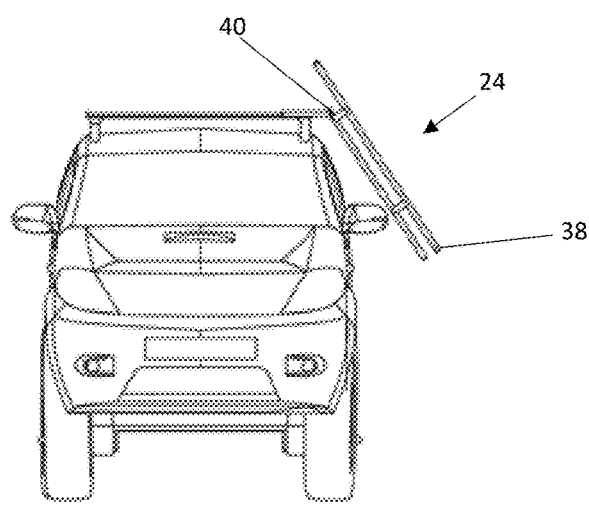

Similarly, FIGS. 15A-15E depict a situation where space is even more restricted. As can be seen from FIG. 15B, pulling on handle 38 causes the upper bar 20 (which is attached via studs 22, 22 to the outer sheath 28 of the lower bar 18) to move with respect to the inner rail 30 of the lower bar 18. The mounting portions 24, 24 of the roof rack 10 are thus caused to move from their position above the roof of the car 12 (FIG. 15A) and into a position where the mounting portions 24, 24 laterally project out from the roof of the car 12 and overhang the side of the car 12 (FIG. 15B). Once in this position, the mounting portions 24, 24 can be pivoted via hinges 40, 40, in the manner described above, towards the third position. As can be seen from FIG. 15C, care needs to be taken during this step because if the user were to let go of the handle 38, then the extended roof rack 10 (in particular the outer sheath 28) may swing into the side of the car 12 and cause damage. Before this happens however, and as can be seen in FIGS. 15D and 15E, the user would extend the handle 38 completely by pulling innermost rail 36 out of the middle rail 34 (FIG. 15D) and then pulling middle rail 34 out of outermost member 32 (FIG. 15E), whereupon the configuration shown and described above in respect of FIG. 5 is achieved.

Whilst the advantageous lever action of the extended handle 38 shown in FIG. 5, for example, would not be as pronounced in the deployment methods depicted in FIGS. 14 and 15, these methods may be the only available options when space is restricted. Further, the end result, where the weight of the offset mounting portions 24, 24, and any articles thereon, is supported by the handle 38 engaging the ground is maintained.

Figure 16:
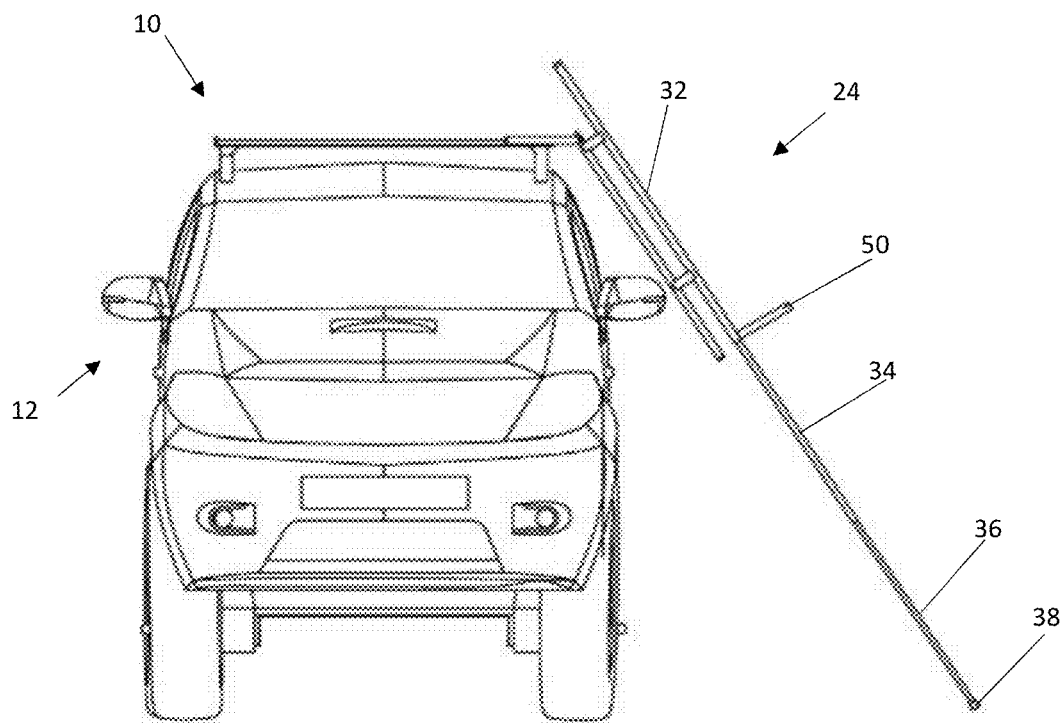
FIG. 16 shows an end view of a car and roof rack in accordance with a further embodiment of the present invention.

Referring now to FIG. 16, shown is another minor variant of the roof rack 10 described above. Specifically, a leg 50 is provided with each mounting portion 24 in order to rest articles thereon if needed during the loading process. Leg 50 may be pivotally attached to outermost member 32, and able to be deployed (i.e. folded out) as necessary. In another embodiment, however, leg 50 may not be pivotally mounted to outermost member 32, but may be permanently fixed in the right angle configuration shown in FIG. 16.

Figure 17:
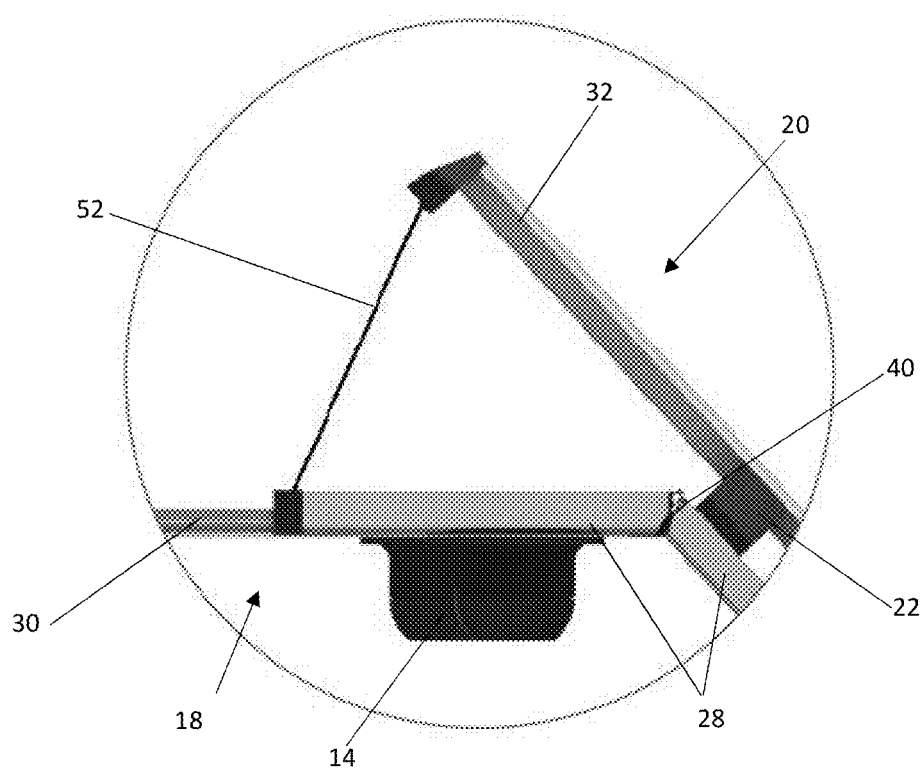
FIG. 17 shows a portion of a roof rack in accordance with a further embodiment of the present invention having a spring loaded safety strap.

Finally, FIG. 17 shows a portion of yet another variant of the roof rack 10 described above. In this roof rack, a spring loaded safety strap 52 is provided between adjacent ends of the outermost member 32 of the upper rail 20 and outer sheath 28 of the lower rail 18. The safety strap 52 has a length that will prevent the mounting portions 24, 24 from pivoting so far about pivots 40, 40 that they (specifically the outer sheathes 28, 28) could make contact with the side of the car (e.g. if the deployment methods described above with reference to FIGS. 14 and 15 went wrong).

Safety strap 52 may be stored in either of the upper 20 or lower 18 rails, for example, on a spool (or the like, not shown) which automatically retracts the strap 52 when the mounting portions 24, 24 are moved from their third position to their second position, as described above. The length of strap 52 may be set for any particular vehicle, for example, during the first installation of the roof rack or based on a database of relevant dimensions of standard vehicles.

It will be appreciated that the present invention provides a number of new and useful results. For example, specific embodiments of the present invention may provide one or more of the following advantages:

it is not necessary to lift (potentially cumbersome and heavy) articles to a height above the automobile in order to load them onto the roof rack;

loading articles at the side of the automobile provides the operator with a clear line of sight to ensure that they are correctly tethering the article to the roof rack;

articles are able to be tethered to the roof rack, even when it is located next to the side of the automobile (in a much more easily inspectable position);

a mechanical advantage can be employed in order to make the lifting/lowering of even very heavy articles onto/off from the roof of an automobile easy;

the weight of any articles mounted to the roof rack will not be felt by the user until it completely overhangs the side of the automobile and is ready for pivoting; and the unique structure of the roof rack can reduce the mechanical stress experienced by the pivots, enabling it to have a relatively simple construction such that it requires less material to form, is lighter, has less wind resistance, etc.

It will be understood to persons skilled in the art of the invention that many modifications may be made without departing from the spirit and scope of the invention. All such modifications are intended to fall within the scope of the following claims. By way of example, it is envisaged that a telescopically extendable handle could be provided as part of a lower rail (e.g. as part of lower rail 18) instead of an upper rail (e.g. as part of upper rail 20) of the roof rack. Other embodiments may involve a pivotable handle, or a mechanism that does not involve sliding, such as a tilting mechanism or mechanism using scissor arms, or the like.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A roof rack comprising:
   a plurality of roof attachments for attaching the roof rack to a roof of an automobile;
   at least two cross bars that are arrangeable across the roof of the automobile, each cross bar comprising a plurality of telescopically extendable members configured to move relative to each other such that the cross bar is extendable into an extended configuration in which a portion of the cross bar would overhang a side of the automobile;
   a mounting rack configured to receive articles on an upper portion thereof, the mounting rack being mounted to the at least two cross bars in a spaced relationship thereto, whereby extending the at least two cross bars into the extended configuration moves the mounting rack between a first position where the mounting rack would overlie the roof of the automobile and a second position where the mounting rack would overhang the side of the automobile, wherein the mounting rack is mounted to an outermost telescopically extendable member of the at least two cross bars which is the last to move into a position overhanging the side of the automobile;

a pivot that is not operable until the mounting rack is in the second position, such that the telescopically extendable members cannot pivot relative to each other during transition between the first and second positions, the mounting rack being pivotable between the second position and a third position where the mounting rack would be adjacent the side of the automobile with the upper portion facing away from the side of the automobile for loading or unloading of the articles; and a handle that is operable to move the mounting rack between the first, second, and third positions, the handle being telescopically extendable from the mounting rack;

a ground engaging portion configured to engage the ground when the mounting rack is in the third position.

2. The roof rack of claim 1, wherein the at least two cross bars are arrangeable transversely across the roof of the automobile between opposing roof attachments.

3. The roof rack of claim 1, wherein the at least two cross bars are joined via at least one longitudinally arrangeable support member.

4. The roof rack of claim 1, wherein the pivot is provided in a member of each cross bar that would overhang the side of the automobile when in the extended configuration.

5. The roof rack of claim 1, wherein the pivot is provided in the outermost telescopically extendable member of each cross bar.

6. The roof rack of claim 1, wherein the pivot comprises a release mechanism which must be released before the mounting rack can pivot between the second and third positions.

7. The roof rack of claim 1, wherein the handle defines the ground engaging portion when the mounting rack is in the third position.

8. The roof rack of claim 1, wherein a portion of the handle is lowerable.

9. The roof rack of claim 1, wherein the roof rack comprises a lock for preventing the at least two cross bars from extending into the extended configuration.

10. The roof rack of claim 9, wherein the lock is a lever that is moveable between open and closed positions.

11. The roof rack of claim 9, wherein the lock is configured to visually indicate whether the cross bars are locked.

12. The roof rack of claim 1, wherein the mounting rack is configured to receive one or more articles independently selected from the group consisting of: bicycles, kayaks, canoes, boats, skis, snowboards, jerry cans, gas cylinders and luggage.

13. A kit of parts for assembling the roof rack of claim 1.

14. A method for loading articles onto a roof rack, the roof rack comprising:

a plurality of roof attachments that attach the roof rack to a roof of an automobile;

at least two cross bars arranged across the roof of the automobile, each cross bar comprising a plurality of telescopically extendable members configured to move relative to each other such that the cross bar is extendable into an extended configuration in which a portion of the cross bar would overhang a side of the automobile;

a mounting rack configured to receive articles on an upper portion thereof, the mounting rack being mounted to the at least two cross bars in a spaced relationship thereto, whereby extending the at least two cross bars into the extended configuration moves the mounting rack between a first position where the mounting rack overlies the roof of the automobile and a second position where the mounting rack overhangs the side of the automobile, wherein the mounting rack is mounted to an outermost telescopically extendable member of the at least two cross bars which is the last to move into a position overhanging the side of the automobile;

a pivot that is not operable until the mounting rack is in the second position, such that the telescopically extendable members cannot pivot relative to each other during transition between the first and second positions, the mounting rack being pivotable between the second position and a third position where the mounting rack is adjacent the side of the automobile with the upper portion facing away from the side of the automobile for loading or unloading of the articles;

a handle that is operable to move the mounting rack between the first, second, and third positions, the handle being telescopically extendable from the mounting rack; and a ground engaging portion configured to engage the ground when the mounting rack is in the third position, the method comprising:

if not already, moving the mounting rack into the third position;

carrying the articles to the side of the automobile;

loading the articles onto the upper portion of the mounting rack;

pivoting the mounting rack from the third position to the second position; and moving the mounting rack from the second position to the first position.

15. The method of claim 14, wherein the roof rack includes a lock for preventing the at least two cross bars from extending into the extended configuration; and the method further comprising: locking the roof rack in the first position.

* * * * *